Figure 1:
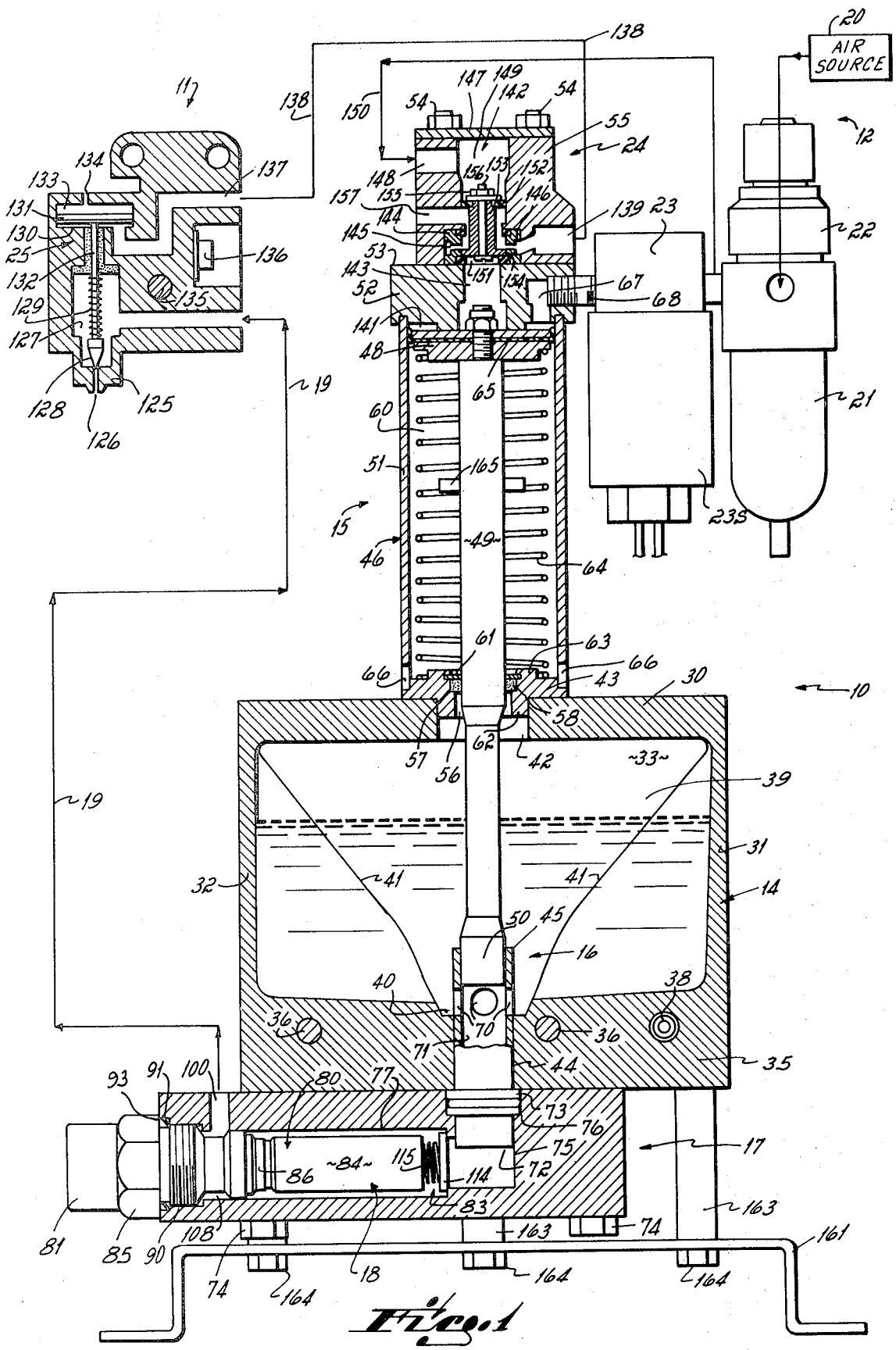

United States Patent [19]
Reighard et al.

[11] 3,815,788
[45] June 11, 1974

[54] THERMOPLASTIC APPLICATOR INCLUDING A REMOVABLE FILTER

[75] Inventors: Alan B. Reighard, Bay Village; Simon Z. Tamny, Lorain, both of Ohio

[73] Assignee: Nordson Corporation, Amherst, Ohio

[22] Filed: Oct. 24, 1972

[21] Appl. No.: 299,838

[52] U.S. Cl. .......... 222/146 HE, 222/189, 222/325, 210/234
[51] Int. Cl. ............................................. B67d 5/60
[58] Field of Search ..... 222/146 HE, 189, 325, 190, 222/192; 210/106, 234, 235

[56] References Cited
UNITED STATES PATENTS

| | | | |
|---|---|---|---|
| 2,793,752 | 5/1957 | Jay | 210/234 H |
| 3,040,894 | 6/1962 | Pall | 210/235 X |
| 3,080,972 | 3/1963 | Smith | 210/235 X |
| 3,113,700 | 12/1963 | Chaffee et al. | 222/189 X |
| 3,327,858 | 6/1967 | Eddy et al. | 210/234 |
| 3,662,927 | 5/1972 | Cocks | 222/146 HE |

*Primary Examiner*—Stanley H. Tollberg
*Assistant Examiner*—James M. Slattery
*Attorney, Agent, or Firm*—Wood, Herron & Evans

[57] ABSTRACT

An applicator system for melting thermoplastic material and supplying the molten or liquid material under pressure and at a controlled temperature to an applicator head or gun. The material is heated in a reservoir from which it is pumped through a manifold block to the applicator gun by a single-acting, sleeve-type air motor driven piston pump. Internally of the manifold block, there is a combination filter, check valve, relief valve cartridge which may be installed or removed from the block as a unit but which also has the filter so mounted that it is separately removable for cleaning or replacement purposes.

11 Claims, 2 Drawing Figures

THERMOPLASTIC APPLICATOR INCLUDING A REMOVABLE FILTER

This application is an improvement upon the disclosure of application Ser. No. 258,891, filed June 1, 1972 for "Thermoplastic Applicator System," which application is assigned to the assignee of this application.

This invention relates to the dispensing of thermoplastic material and particularly to the dispensing of materials of the so-called "hot melt" adhesive type. More particularly, this invention relates to dispensing systems in which solid thermoplastic material is melted and then pumped in a molten state to an applicator head or gun.

Thermoplastic adhesives, or so-called "hot melt" adhesives are now commonplace and are used for bonding numerous diverse materials. Primarily, however, hot melts are used for sealing packages where the high speed setting time of the hot melt material may be used to advantage. The applicator system of this invention is primarily intended for application of the thermoplastic materials to packages but it is also applicable to other types of applications, as for example, the application of hot melt materials in the assembly of automobiles, electronics, electrical equipment, appliances, electrical components, furniture, aircraft subassemblies, and metal-to-metal bonds.

In the above-identified patent application, upon which the invention of this application is an improvement, there is disclosed a dispensing applicator which comprises a heated melting tank or reservoir for receiving solid thermoplastic material and melting that material to convert it to a molten state. There is a sleeve-type piston pump located in the reservoir for pumping molten material from the tank through a manifold block to a dispensing gun. The piston of the pump is driven by a single-acting pneumatic motor mounted upon the top of the reservoir. During each stroke of the pump piston, a slug of material is charged into the barrel so that during subsequent forward movement of the piston the slug is forced through the barrel into and through a hose to the dispensing gun.

That apparatus also includes an interlock valve mounted on the top of the air motor through which air from the pressure chamber of the pneumatic motor flows to the dispensing gun so as to effectuate opening of a control valve of the gun. This interlock valve, though, normally maintains the flow path to the dispensing gun blocked until such time as the pressure in the pneumatic chamber of the motor reaches a predetermined value, which value is only reached when the back pressure of the pump causes the pneumatic pressure to reach a preset value. Consequently, the interlock valve insures that the flow control valve of the gun is only opened when the molten material is at a preset application pressure.

The manifold block, through which the molten material must pass before it reaches the gun, has a filter mounted therein, through which the material must pass before it reaches the gun. The purpose of that filter is to insure that foreign objects or solid particulate material does not pass from the pump to the gun and there clog the relatively small orifices and passageways.

A difficulty has been encountered with the apparatus disclosed in the above-identified application in connection with the removal of the filter for purposes of cleaning or replacing it. That filter cannot be removed unless the reservoir and pump are first completely drained, but that is often inconvenient and particularly so if for any reason the filter becomes clogged while the reservoir is full of molten material. Consequently, it has been one objective of this invention to provide a filter cartridge which enables the filter to be removed without first draining the reservoir or pump.

To enable the filter to be removed without draining the reservoir, the invention of this application includes the filter as a component of a cartridge, another component of which is a check valve located adjacent the intake end of the cartridge. The cartridge is so constructed, though, that the filter may be removed from the cartridge while still leaving the check valve in place. Alternatively, the complete cartridge, including the filter and the check valve, may be removed for cleaning or replacing elements of the check valve.

The inclusion of a check valve in the flow path between the molten material reservoir and a valve operated dispensing gun creates another problem because of the tendency of hot melt materials while in the molten state to evolve gases and thermally expand. When this thermal expansion occurs between a closed check valve and a closed dispensing gun valve, some provision must be made for that thermal expansion. Consequently, another objective of this invention has been to provide a filter cartridge which includes a pressure relief valve to permit back flow of molten material to the reservoir when the pressure in the cartridge exceeds a preset value. This objective has been satisfied by including in the filter cartridge not only a one-way check valve but also a reverse flow pressure relief valve. In the preferred embodiment, the pressure relief valve and the check valve are colinearly aligned and so constructed that components of the check valve act on components of the relief valve and vice versa.

The primary advantage of this combination filter, check valve and relief valve cartridge assembly is that it provides a relatively inexpensive unit which may be inserted and removed from the dispensing apparatus as a subassembly. It is so constructed, though, that the filter portion of the cartridge may be removed separately while leaving the check valve and pressure relief valve in place as a barrier to flow of molten material from the reservoir when the filter is removed for cleaning and replacement purposes.

Figure 2:
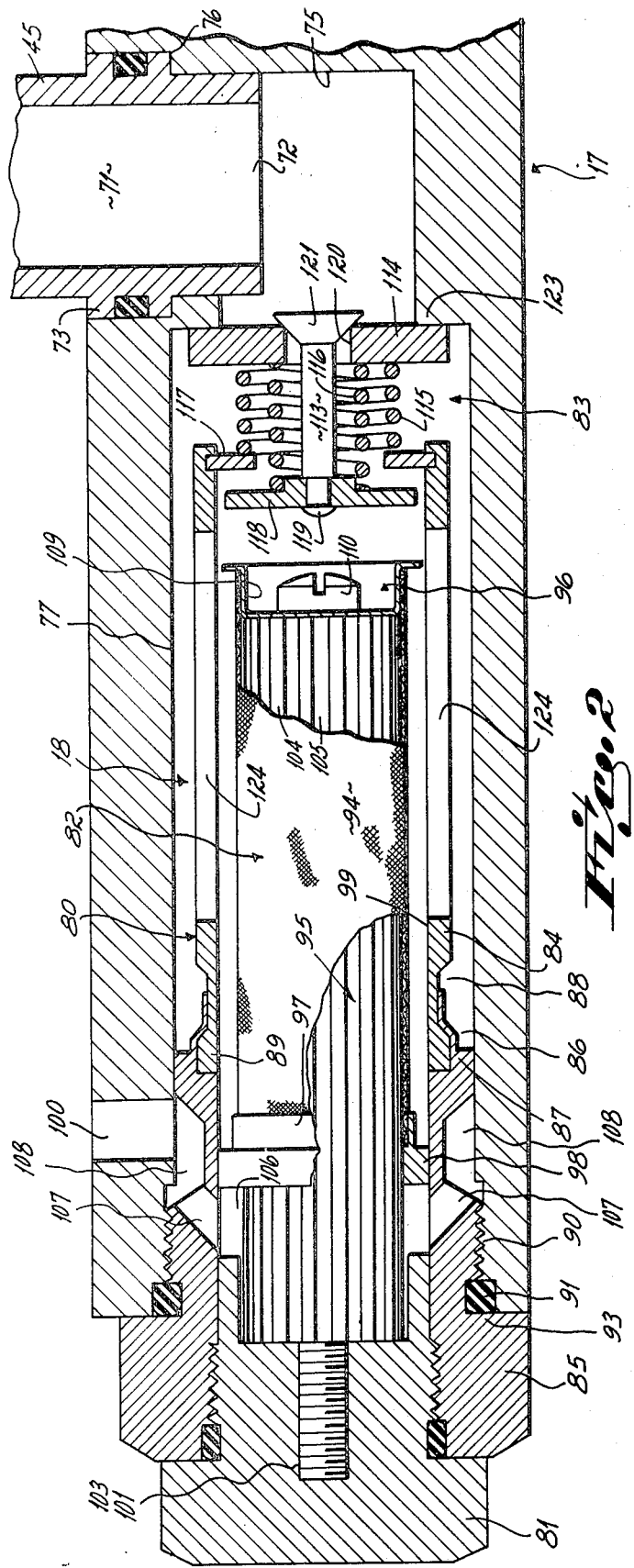

These and other objects and advantages of this invention will be more readily apparent from the following description of the drawings in which:

FIG. 1 is a cross sectional view of a dispensing system incorporating the invention of this application; and FIG. 2 is an enlarged cross sectional view of a portion of FIG. 1.

Illustrative of a system of the type to which the invention of this application is applicable, there is illustrated in FIG. 1 of the drawings a complete dispensing system for receiving thermoplastic material in a solid form, converting the material to a molten state, and supplying the material under pressure to a dispensing gun. The system comprises a machine 10 for receiving the material in a solid state, melting it and supplying it at a pressure of from 200–1,200 p.s.i. to a dispensing gun 11. Both the gun 11 and the machine 10 are pneumatically actuated and are interconnected by a pneumatic control system indicated generally by the numeral 12.

The machine 10 comprises a heated reservoir 14, a pneumatic motor 15, a pump 16, and a manifold block 17. A combination filter, check valve and relief valve cartridge 18 is located in the manifold block 17 and is so positioned that material must pass through it before being transported through a hose 19 to the dispensing gun 11. The invention of this application is primarily concerned with that cartridge 18.

The pneumatic control system 12 comprises a source of air pressure 20, an air filter 21, a pressure regulator 22, a 3-way solenoid-operated valve 23, and a pilot-operated, differential pressure valve 24. As is explained more fully hereinafter, the valve 24 serves as an interlock between the pump driving pneumatic motor 15 and a pneumatic motor 25 of the dispensing gun 11.

Reservoir

The reservoir 14 is preferably made from heavy cast aluminum. It comprises a top wall 30, a pair of side walls 31 and 32, a pair of end walls 33, and a bottom wall 35. In the preferred embodiment there is a pair of heating elements 36 cast into the bottom wall 35 of the reservoir. There is also an electrical thermostat 38 embedded in the bottom wall 35 for controlling the temperature of the heaters 36.

The top wall 30 of the reservoir 14 has a large opening (not shown) covered by a movable lid (not shown) of a housing. Solid thermoplastic material is inserted into the interior chamber 39 of the reservoir through this opening. The heaters 36 of the reservoir then cause the solid material to be melted and, while in the molten state, to flow toward the lower front end 40 of the reservoir. To facilitate melting of the solid material, there are heat transfer fins 41 which slope forwardly between the bottom wall 35 and the side walls 31, 32.

In addition to the opening in the top wall 30 of the reservoir, there is a circular opening 42 near the front which is adapted to receive an end cap 43 of the pneumatic motor 15. This circular opening 42 is machined into the top wall by a drill which may be stepped so as to also bore a smaller diameter hole 44 in the bottom wall. If the two holes 42, 44 are drilled by a single stepped tool, concentricity is assured and consequently a barrel 45 of the pump 16 mounted in the bore 44 is concentrically mounted relative to the motor cylinder 46 which is located from and supported in the bore 42.

Pneumatic Motor

The pneumatic motor 15 comprises the cylinder 46 within which a piston 48 is slideable. A piston rod 49 extends downwardly from the piston 48 through the end cap 43 of the cylinder and the aperture 42 of the reservoir. This piston rod 49 terminates in a piston 50 which is received within the barrel or sleeve 45. Together, the piston 50 and sleeve 45 function as a pump, as is explained more fully hereinafter.

The cylinder 46 comprises the lower end cap 43, a sleeve 51 and an upper ported end cap 52. The two end caps 43, 52 and the sleeve 51 are held in an assembled relationship by four corner bolts (not shown) which extend for the length of the cylinder and are threaded into the top wall 30 of the reservoir. There is a flat top surface 53 on the cap 52 which serves as a seat for the interlock valve 24. This latter valve is bolted to the top cap 52 by bolts 54 which extend through the housing 55 of the valve 24 and are threaded into the top of the cap 52.

The lower end cap 43 functions as a packing gland and heat insulator between the cylinder 46 and the top wall 30 of the reservoir. It has a stepped axial bore 56 extending through it to provide a shoulder 57 which seats a metal annular lip seal or ring 58. In addition to functioning as a seal, the annular ring 58 also functions as a scraper to prevent molten material from adhering to the rod 49 and collecting in the chamber 60. A snap ring 61 retains the ring seal 58 on the seat 57 of the stepped bore 56. At the lower end the cap 43 terminates in a hub section 62 which fits within the bore 42 of the reservoir and locates the cylinder 46 on the reservoir 14. The upper end of this cap 43 also terminates in a hub section 63 over which there is fitted a compression spring 64. The top of this spring 64 is received over a hub section of the piston 48. This spring 64 functions as a return spring to bias the piston 48 upwardly into the position illustrated in FIG. 1.

The piston 48 is made in two sections between which there is sandwiched a flexible cup seal 65. This seal precludes air pressure from leaking past the piston into the lower chamber 60 of the cylinder while still permitting some limited lateral movement of the piston relative to the cylinder. Similarly, clearance between the periphery of metal lip seal 58 and the shoulder of the cap within which it is seated permits some limited lateral movement of seal ring 58 and the piston rod so that close tolerances need not be maintained between the cylinder and the reservoir in order to have the piston rod 49 aligned with the bore of the sleeve 45. To further minimize the criticality of tolerances between these two components, several thousandths of an inch clearance is provided between the piston 50 and sleeve 45. This minimization of critical tolerances reduces the total cost of the machine without in any way impairing its operation or sacrificing quality of the resulting product.

In order to prevent contamination of the motor chamber 60 by fumes and gases evolved from the molten material 11 and consequent collection of the gaseous precipitates on the motor components, the lower end of the cylinder 46 is ported as indicated at 66. As a consequence of this porting, each stroke of the piston causes the air contained in the lower chamber 60 to be expelled and ambient air to be subsequently drawn into the chamber. To minimize deterioration of the motor components, the end cap 43 is preferably manufactured from a heat insulative material.

Air at a preselected pressure (as for example, on the order of from 50–80 p.s.i.) is supplied to the top side of the piston 48 through a passage 67 in the end cap 52. This passage is threaded and receives a pipe threaded fitting 68 which interconnects the passageway 67 to the three-way solenoid-operated valve 23. This valve 23 serves to alternatively connect the passage 67 to either air at 50–80 p.s.i. or air at atmospheric pressure, depending upon the condition of the solenoid 23S.

Sleeve Pump and Manifold

Molten material is supplied to the gun 12 at a pressure of between 200 and 1,200 p.s.i., depending upon the material and the substrate to which it is applied. The piston pump which pressurizes the molten material to this extent comprises the piston 50 on the end of the piston rod 49 and the sleeve 45. This sleeve has four radial ports 70 which open into the bottom 40 of the reservoir chamber 39. When the piston 50 is in the raised position illustrated in FIG. 1, molten material flows into the interior chamber 71 of the sleeve through the ports 70 so that upon subsequent downward movement of the piston 50, it causes a slug of molten material to be pushed through the outlet port 72 of the sleeve.

The sleeve 45 extends through the bottom wall 35 of the reservoir 14 and has a lower flange 73 abutting against the bottom of the reservoir. When the manifold 17 is secured onto the bottom of the reservoir by bolts 74, a stepped bore 75 of the manifold fits over the lower end of the sleeve 45 and a shoulder 76 of the bore 75 contacts the flange 73 of the sleeve to lock the flange 73 between the manifold and the bottom of the reservoir.

The vertical bore 75 of the manifold plate is intersected by a transverse bore 77. This latter bore is stepped and receives the filter, check valve, relief valve cartridge 18 which is the subject of this invention. Functionally, this cartridge 18 insures that the molten material which enters the gun 11 is free of particulate matter which might otherwise clog the small passages and orifices of the dispenser gun 11.

Filter, Check Valve, Relief Valve Cartridge

Referring now to FIG. 2, it will be seen that the filter, check valve, relief valve cartridge 18 (hereinafter referred to as a filter cartridge 18) comprises a two-piece cartridge body 80 within which there is secured a threaded plug 81 and an attached filter 82. The end of the cartridge body 80 remote from the threaded plug 81 is closed by a combination check valve and pressure relief valve assembly 83.

The two-piece cartridge body 80 comprises a tubular sleeve 84 and an end cap 85. The attachment 86 between the two pieces 84, 85 comprises an end section 87 of the closure cap which is swaged over and into an annular recess 88 in the end 89 of the tubular body 84.

In order to secure the filter cartridge 18 in the manifold block 17, the outer end of the bore 77 is counterbored and threaded as indicated at 90. This threaded section of the bore 77 receives a threaded portion of the end cap 85. There is preferably an O-ring seal 91 sandwiched between a flange 93 of the end cap and the end of the manifold block to prevent molten material from leaking around the threads of the block.

The filter 82 comprises an exterior cylindrical screen 94 mounted over a tie bolt 95 and secured thereto by an end cap 96. At its outer end the screen has an annular ring 97 brazed to it. A flange 98 of this ring 97 engages the surface of the cartridge body bore 99 and forms a flow path barrier which forces all molten material entering the cartridge from the bore 75 to pass through the filter screen 94 before exiting from the cartridge 18 through an exit port 100 of the manifold block 17.

The tie bolt terminates at its outer end in a threaded stud 101 which is threaded into a bore 103 of the plug 81. This connection 101, 103 of the filter, tie bolt 95 and plug 81 enables the filter 82 to be removed from the cartridge 18 without removal of the cartridge 18 from the manifold block 17, as is explained more fully hereinafter.

Over its peripheral surface the tie bolt 95 is provided with circumferentially spaced axially extending ribs 104 which form grooves or flutes 105 on the periphery of the bolt. These ribs are slideable within and engage the interior of the cylindrical screen 94 and support this screen against deformation or collapse. The grooves 105 collect and direct filtered material after passage through the screen 94 to an annular passage 106 around the outer end of the tie bolt 95. From this annular passage 106 the filtered molten material passes through passages 107 in the end cap 85 to an annular passage 108 defined by an annular groove in the exterior of the end cap 85. This latter groove 108 is in fluid communication with the port 100 of the manifold block 17 which is in turn connected via conduit 19 to the intake end of the dispensing gun 11.

The filter screen 94 is held on the tie bolt 95 by the end cap 96. This cap 96 is generally cup-shaped and has a radial flange 109 which engages and holds the filter screen 94 on the end of the tie bolt 95. A bolt 110 secures the cap 96 onto the end of the tie bolt 95.

To remove the screen for purposes of replacing it or cleaning it, all that is required is to remove the tie bolt 95 and the attached screen and end cap 96 as a unit from the cartridge body. After removal from the cartridge body, the end cap 96 may be unthreaded from the tie bolt and the filter screen 94 slipped from over the tie bolt. The screen may then be cleaned or replaced with a new clean screen, the end cap threaded back onto the tie bolt, and the filter assembly rethreaded into the cartridge body 80.

The combination check valve-relief valve 83 comprises a relief valve plunger 113, a check valve plate 114 and a pair of springs 115, 116, all of which are held in an assembled relation by a keeper ring 117 secured in the end of the cartridge body sleeve 84. The relief valve plunger has a ring or flange 118 permanently secured on its inner end by an upset head 119. The opposite end of the plunger extends through a hole 120 in the center of the check valve plate 114 and terminates in an outwardly flared tapered head 121. The outermost end of the head 121 is larger than the hole so that the head of the plunger cannot pass through the hole. The inner spring 116 rests at one end against the inside surface of the check valve plate 114 and at the other end against the ring 118 on the end of the plunger. Consequently, the spring 116 biases the ring 118 away from the plate 114 and the head 121 of the plunger into a closed position relative to the check valve plate 114. The other spring 115 rests at one end against the retainer ring 117 and at the opposite end against the check valve plate 114. It biases the check valve plate 114 against a shoulder 123 of the bore 77 in the manifold block 17.

In operation, the plate 114 and the cooperating shoulder 123 of the manifold block 17 act as a one-way check valve because of the plate 114 being forced against the shoulder by the spring 115. When the hot melt adhesive pressure within the bore 75 is sufficiently great to generate a force sufficient to overcome the force of the spring 115, the plate moves away from the shoulder and permits hot melt adhesive material to flow from the bore 75 into the bore 77 and subsequently through slots 124 of the sleeve 84 into the filter 82. If the pressure in the chamber 77 exceeds a preset value, the force generated by that pressure will cause the pressure relief valve to open and allow thermoplastic material to flow back from the bore 77 into the bore 75 through the hole 120 and around the valve plunger 113. The need for this pressure relief valve arises because the thermoplastic material contained in the bore 77 and in the filter as well as in the conduit 100 and the dispensing gun evolves gases while the material is heated and maintained in a molten condition. Consequently, when the valve of the gun is closed for a prolonged period of time, the pressure internally of the filter increases and must be relieved. The relief valve 83 enables the molten material to flow back through the filter chamber into the reservoir 14 when this condition obtains. The check valve, on the other hand, is intended to prevent flow of molten material from the reservoir 14 when the filter is replaced in the filter cartridge. When the filter 82 and the attached plug 81 are removed from the cartridge, the check valve 83 prevents molten material from flowing out of the reservoir so that the filter screen may be replaced without having to first drain the reservoir and the pump.

Dispenser Gun

Molten material is supplied from the outlet port 100 of the manifold 17 to the dispenser gun through the conduit 19. In the preferred embodiment the conduit 19 is heated so as to maintain the material in a molten state. A heated flexible hose which is particularly suited to this application is disclosed in U.S. Pat. No. 3,585,361, which patent is assigned to the assignee of this application.

The dispensing gun 11 is a conventional pneumatically actuated gun which is commercially available and per se forms no part of the invention of this application. One such suitable gun is disclosed in U.S. Pat. No. 3,570,725, which patent is also assigned to the assignee of this application.

Preferably, the gun 11 comprises a nozzle 125 having an outlet orifice 126 through which molten material may be dispensed from a pressurized chamber 127 under the control of a flow control valve 128 and differential hydraulic pressure. This valve is maintained in a closed position by a spring 129 and is opened as a consequence of air pressure being supplied to a pressure chamber 130 of the gun. A piston 131 secured to the valve 128 by a piston rod 132 causes the valve to open and permit flow from the chamber 127 as a consequence of air pressure being supplied to the chamber 130. A chamber 133 on the opposite side of the piston 131 from the chamber 130 is open to atmosphere through an orifice 134.

In the preferred embodiment the gun contains an electric heater 135 and a thermostat 136 which controls the supply of power to the heater 135. Air at an appropriate pressure to overcome the spring 129 and hydraulic pressure in chamber 127 is supplied to the chamber 130 of the gun through a passage 137 and a conduit 138. The conduit 138 is in turn connected to an outlet port 139 of the interlock valve 24.

Interlock Valve

The function of the interlock valve is to insure that the flow control valve 128 of the dispenser gun 11 is always closed during the return stroke of the piston 48 of the pneumatic motor 15 and during the forward stroke of the piston until such time as the molten material in the pump reaches the desired outlet pressure. When this full pressure condition is reached, it is reflected as back pressure on the top side of the piston 48 and it is this back pressure in the top chamber 141 of the pneumatic motor 15 which is sensed and used to control opening and closing of the gun valve 128.

As seen in FIG. 1, the interlock valve 24 comprises the valve body 55 through which there extends an axial bore 142 which communicates with an axial bore 143 of the end cap 52. This bore has a counterbored lower end section within which there is mounted a valve sleeve 144. The sleeve has a pair of orifices 145 which extend from the interior to an annular groove 146 around the exterior. This groove in turn is in fluid communication with the gun supply port 139.

The axial bore 142 of the valve is closed at the top by a cap 147 which is secured to the top of the body 55 by the bolts 54 which extend through the body 55 and are threaded into the end cap 52 of the motor.

There is a port 148 in the upper part of the valve body which connects the upper end chamber 149 of the valve to the source of air pressure 20 via the regulator-filter and air conduit 150. The lower end chamber 151 of the valve is connected to the pressure chamber 141 of the pneumatic motor via the axial passage 143 in the top cap 52 of the air motor.

Slideably mounted within the through bore 142 of the valve, there is a spool 153 which has differential areas at its opposite ends. The lower end of this spool is of larger area than the upper end. It is defined by a flange 154 which is slideable within the sleeve 144 between a lower position in which it is located in sealing contact with a compressible shoulder on one side of the orifice 145 to an upper position in which it is located in sealing contact with a compressible shoulder on the opposite side of the orifice 145. The width of the flange 154 is greater than the diameter of the orifice 145 so that between the two positions into which it is movable it crosses and completely covers the orifice 145.

The upper smaller diameter end section of the spool 153 is defined by a flexible resilient seal 152. This seal is secured to the end of the spool by a washer and a nut 155 which is threaded onto a bolt 156. Between the two end areas of the spool, there is an annular groove which is always open to atmosphere through an exhaust port 157 in the valve body.

In operation, the valve functions to connect the motor chamber 130 of the gun 11 to the source of regulated air pressure only when the pressure of molten material in the pump chamber 71 is at a predetermined value. At that time air pressure entering into the upper chamber 141 of the air motor 15 causes the force generated by the pressure in the chamber 151 acting on the valve to increase to a value where it exceeds the force acting on the valve in the chamber 149. At that time the valve spool 153 moves upwardly and in so doing the flange 154 passes over the orifices 145 into contact with the upper seal and opens those orifices 145 to the pressure contained in the chamber 151. Air pressure is then transmitted from the passage 67 through the chamber 141 of the air motor, the passage 143 of the cap 52, the orifices 145, through the conduit 138 to the pressure chamber 130 of the dispensing gun. The valve 128 of the gun then opens to allow pressurized molten material to pass from the chamber 127 through the orifice 126 and onto a substrate. When the solenoid valve 23 is subsequently actuated so as to connect the passage 67 to exhaust or atmospheric pressure, the force of the pressure in the chamber 151 begins to lower and the higher air pressure force in upper chamber 149 causes the spool 153 to snap downwardly and engage the lower seal, thereby connecting the chamber 130 of the gun to exhaust through the conduit 113, the orifice 145, the groove of the spool, and the exhaust port 157 of the valve, thus allowing the gun to close without waiting for the pressure in the chamber 151 to decay.

Housing

The melting temperature of many thermoplastic materials of the so-called "hot melt" type is in excess of 300° F. Consequently, the reservoir 14 must be isolated to prevent the escape of heat from the reservoir and to protect operators from contact with it. To that end, the reservoir 14 is encased in an insulative packing (not shown). This packing is in turn surrounded by a sheet metal housing.

The bottom of the reservoir 14 is spaced from a base 161 of the housing by heat insulation spacers 163 which surround bolts 164. These bolts extend through the spacers and are threaded into the bottom of the reservoir. The heat insulative spacers 163 insure the maintenance of an air gap between the base mounting bracket 161 and the bottom of the reservoir.

One end of the housing (not shown) encloses a control area (not shown) within which all of the electrical controls of the machine are housed. Since these controls form no part of the invention of this application, they have not been illustrated or described in detail. Generally, though, these controls function to control the flow of electrical power to the heaters 36 of the reservoir 14 as well as the heater 135 of the gun and the heating element of the conduit 19. To that end the electrical contacts (not shown) of these heating elements extend into the control area of the housing through suitable insulative packing.

Operation

In operation, solid powders or pellets or chunks of thermoplastic material are placed in the reservoir 14. Electrical power to the machine is then turned on and the machine allowed to heat up to a temperature and for a time sufficient to convert the solid thermoplastic material in the reservoir to a molten state.

An electric control circuit is then actuated so as to cause energization of the electrical solenoid 23S of the valve 23. This control circuit forms no part of the invention of this application and therefore has not been illustrated in detail. One suitable control circuit is disclosed in pending U.S. Pat. application Ser. No. 194,862 of Robert G. Baker et al for "Thermoplastic Dispenser System," which application is assigned to the assignee of this application. The control circuit there disclosed operates upon the principal of having a workpiece, as for example, a flap of a carton, contacting and closing a control switch, which switch then energizes the pump control solenoid 23S. Assuming that the control circuit is utilized for controlling the solenoid 23S, the flap control switch is first manually energized for a sufficient numer of strokes of the piston pump so as to fill and pressurize molten material in the pump sleeve chamber 71, the conduit 19 and the dispensing gun chamber 127.

Upon energization of the solenoid of valve 23, the main air pressure source 20 is connected through the filter 21 and regulator 22 to the inlet port 67 of the pneumatic motor 15 through appropriate porting of the valve 23. Whenever the air pressure source 20 is connected to the regulator 22, air at the regulated pressure is supplied via line 150 to the chamber 142 of the interlock valve 24.

When air pressure is supplied to the port 69, the piston 48 of motor 15 is caused to move downwardly until either the back pressure of the molten material contained in the pump sleeve 71 arrests downward movement of the piston or a stop 165 on the piston rod 49 bottoms out against the top surface of the cap 43. During this downward movement of the piston 48, the spool 153 of the valve 24 remains in the lower position against lower seal, as illustrated in the drawings. The force required to compress the spring 64 is so selected that the pressure in the chamber 141 does not reach 80 percent of the pressure in chamber 149 until the downward movement of the piston 48 is terminated by the back pressure of the molten material in the chamber 71, reaching the preset application pressure of the material.

When this back pressure in chamber 71 is reached, it causes the pneumatic pressure in the chamber 141 and consequently in the connected chamber 143 to increase to 80 percent of regulated air pressure. The spool 153 then moves upwardly to its uppermost position into engagement with upper seal and in so doing the flange 154 of the spool crosses over the orifice 145, thereby connecting the chamber 143 to the pneumatic line 138 and to the chamber 130 of the dispenser gun. The valve 24 then causes the valve 128 of the gun to open and dispense the molten material from the chamber 127 onto a substrate.

In the preferred embodiment the substrate, as for example, the flap of a carton or container, actuates the switch which controls the solenoid 23S. When that flap disengages the switch, the solenoid 23S is de-energized, thereby connecting the inlet port 67 of the motor 15 to atmospheric pressure through the valve 23. When this occurs, the pressure in chamber 141 is immediately lowered to a value less than 80 percent of regulated air pressure and the spool 153 of the valve 24 immediately snaps downwardly to disconnect the chamber 130 of the dispensing gun motor 25 from the pressure in chamber 141 of the pneumatic motor 15 and quickly dumps the air pressure in chamber 130 to atmosphere through port 157. The force of spring 64 then forces the piston 48 upwardly while air is exhausted from the chamber 141 through the inlet port 67 and the solenoid valve 23. When the switch which controls energization of the solenoid 23S is again energized, this cycle is repeated.

While we have described only one preferred embodiment of this invention, persons skilled in the art to which it pertains will appreciate a number of changes and modifications which may be made without departing from the spirit of the invention. Therefore, we do not intend to be limited except by the scope of the appended claims.

Having described our invention, we claim:

1. A system for dispensing molten thermoplastic material comprising
   a source of molten material,
   a pump having an inlet port and an outlet port, said inlet port being in fluid communication with said source of molten material,
   a dispenser gun including a gun inlet port, a flow control valve, and a gun outlet orifice,
   means defining a flow path connecting the inlet port of said gun to the outlet port of said pump,
   cartridge mounting means located in said flow path, a combination filter, check valve, relief valve cartridge mounted in said cartridge mounting means, said cartridge comprising a generally tubular body having a combination check valve-relief valve mounted in one end and a removable plug mounted in the opposite end, said cartridge further including a filter removably attached to said plug and removable from said cartridge only by removal of said plug, and means supporting said plug and filter in said body so that said plug and filter are removable from said cartridge body while said combination check valve-relief valve is retained in said tubular body.

2. The dispensing system of claim 1 in which said filter comprises a cylindrical filter screen mounted over an externally fluted core.

3. The dispensing system of claim 1 in which said combination check valve-pressure relief valve comprises a pressure relief valve plunger slideably mounted in the end of said body, a check valve plate slideably mounted over said plunger, said plate having a first valve seat engageable with said cartridge supporting means and a second valve seat engageable with said plunger, first spring means for urging said plate into engagement with said first seat such that said plate, first spring means and first seat together form a one-way flow check valve, and second spring means for urging said plunger into engagement with said second seat such that said plunger, second spring means, and plate together form a pressure relief valve for relieving excessive pressure internally of said tubular body.

4. A system for dispensing molten thermoplastic material comprising
- a heated reservoir for holding and maintaining said material in a molten state, said reservoir having bottom, side and top walls,
- a cylinder secured to one of said walls of said reservoir and having an axial bore therein,
- a motor piston movable within said cylinder bore and having a piston rod projecting into said reservoir,
- a pump secured to said motor piston rod, said pump having an outlet port, said pump being operable upon reciprocation of said motor piston to eject molten material from said reservoir through said pump outlet port,
- a dispenser gun including a gun inlet port, a flow control valve, and a gun outlet orifice,
- conduit means connecting the inlet port of said gun to the outlet port of said pump,
- cartridge mounting means located in said conduit means,
- a combination filter, check valve, relief valve cartridge mounted in said cartridge mounting means in the flow path of said conduit means, said cartridge comprising a generally tubular body having a combination check valve-pressure relief valve mounted in one end and a removable plug mounted in the opposite end, said cartridge further including a filter removably attached to said plug and removable from said cartridge only by removal of said plug, and means supporting said plug and filter in said body so that said plug and filter are removable together as a unit from said cartridge body while said combination check valve-relief valve is retained in said tubular body.

5. The dispensing system of claim 4 in which said cartridge mounting means has an inlet port and an outlet port, said cartridge body extending between and defining a flow path between said inlet and outlet ports of said cartridge mounting means, said cartridge combination check valve-pressure relief valve being located within said cartridge body, closely adjacent said inlet port of cartridge mounting means.

6. The dispensing system of claim 4 in which said filter comprises a cylindrical filter screen mounted over an externally fluted core.

7. The dispensing system of claim 4 in which said combination check valve-pressure relief valve comprises a pressure relief valve plunger slideably mounted in the end of said body, a check valve plate slideably mounted over said plunger, said plate having a first valve seat engageable with said cartridge supporting means and a second valve seat engageable with said plunger, first spring means for urging said plate into engagement with said first seat such that said plate, first spring means and first seat together form a one-way flow check valve, and second spring means for urging said plunger into engagement with said second seat such that said plunger, second spring means, and plate together form a pressure relief valve for relieving excessive pressure internally of said tubular body.

8. A system for dispensing molten thermoplastic material comprising
- a source of molten material,
- a pump having an inlet port and an outlet port, said inlet port being in fluid communication with said source of molten material,
- a dispenser gun including a gun inlet port, a flow control valve, and a gun outlet orifice,
- means defining a flow path connecting the inlet port of said gun to the outlet port of said pump,
- cartridge mounting means located in said flow path,
- a combination filter, check valve, relief valve cartridge mounted in said cartridge mounting means, said cartridge comprising
- a body having a combination check valve-pressure relief valve mounted in said body, a plug mounted in said body, said cartridge further including a filter attached to said plug, and said plug and filter being separately removable from said cartridge body while said combination check valve-relief valve is retained in said body, and
- said combination check valve-pressure relief valve comprising a pressure relief valve plunger slideably mounted in the end of said body, a check valve plate slideably mounted over said plunger, said plate having a first valve seat engageable with said cartridge supporting means and a second valve seat engageable with said plunger, first spring means for urging said plate into engagement with said first seat such that said plate, first spring means and first seat together form a one-way flow check valve, and second spring means for urging said plunger into engagement with said second seat such that said plunger, second spring means, and plate together form a pressure relief valve for relieving excessive pressure internally of said tubular body.

9. A system for dispensing molten thermoplastic material comprising
- a source of molten material,
- a pump having an inlet port and an outlet port, said inlet port being in fluid communication with said source of molten material,
- a dispenser gun including a gun inlet port, a flow control valve, and a gun outlet orifice,
- means defining a flow path connecting the inlet port of said gun to the outlet port of said pump, cartridge mounting means located in said flow path, a combination filter, check valve, relief valve cartridge mounted in said cartridge mounting means, said cartridge comprising a generally tubular body having a combination check valve-relief valve mounted in one end and a plug mounted in the opposite end, said cartridge further including a filter attached to said plug, means supporting said plug and filter in said body so that said plug and filter are separately removable from said cartridge body while said combination check valve-relief valve is retained in said tubular body, and said combination check valve-pressure relief valve comprising a pressure relief valve plunger slideably mounted in the end of said body, a check valve plate slideably mounted over said plunger, said plate having a first valve seat engageable with said cartridge supporting means and a second valve seat engageable with said plunger, first spring means for urging said plate into engagement with said first seat such that said plate, first spring means and first seat together form a one-way flow check valve, and second spring means for urging said plunger into engagement with said second seat such that said plunger, second spring means, and plate together form a pressure relief valve for relieving excessive pressure internally of said tubular body.

10. A system for dispensing molten thermoplastic material comprising a heated reservoir for holding and maintaining said material in a molten state, said reservoir having bottom, side and top walls, a cylinder secured to one of said walls of said reservoir and having an axial bore therein, a motor piston movable within said cylinder bore and having a piston rod projecting into said reservoir, a pump secured to said motor piston rod, said pump having an outlet port, said pump being operable upon reciprocation of said motor piston to eject molten material from said reservoir through said pump outlet port, a dispenser gun including a gun inlet port, a flow control valve, and a gun outlet orifice, conduit means connecting the inlet port of said gun to the outlet port of said pump, cartridge mounting means located in said conduit means, a combination filter, check valve, relief valve cartridge mounted in said cartridge mounting means in the flow path of said conduit means, said cartridge comprising a body having a combination check valve-pressure relief valve mounted in said body, a plug mounted in said body, said cartridge further including a filter attached to said plug, said plug and filter being separately removable from said cartridge body while said combination check valve-relief valve is retained in said body, and said combination check valve-pressure relief valve comprising a pressure relief valve plunger slideably mounted in the end of said body, a check valve plate slideably mounted over said plunger, said plate having a first valve seat engageable with said cartridge supporting means and a second valve seat engageable with said plunger, first spring means for urging said plate into engagement with said first seat such that said plate, first spring means and first seat together form a one-way flow check valve, and second spring means for urging said plunger into engagement with said second seat such that said plunger, second spring means, and plate together form a pressure relief valve for relieving excessive pressure internally of said tubular body.

11. A system for dispensing molten thermoplastic material comprising a heated reservoir for holding and maintaining said material in a molten state, said reservoir having bottom, side and top walls, a cylinder secured to one of said walls of said reservoir and having an axial bore therein, a motor piston movable within said cylinder bore and having a piston rod projecting into said reservoir, a pump secured to said motor piston rod, said pump having an outlet port, said pump being operable upon reciprocation of said motor piston to eject molten material from said reservoir through said pump outlet port, a dispenser gun including a gun inlet port, a flow control valve, and a gun outlet orifice, conduit means connecting the inlet port of said gun to the outlet port of said pump, cartridge mounting means located in said conduit means, a combination filter, check valve, relief valve cartridge mounted in said cartridge mounting means in the flow path of said conduit means, said cartridge comprising a generally tubular body having a combination check valve-relief valve mounted in one end and a plug mounted in the opposite end, said cartridge further including a filter attached to said plug, and means supporting said plug and filter in said body so that said plug and filter are separately removable from said cartridge body while said combination check valve-relief valve is retained in said tubular body, and said combination check valve-pressure relief valve comprising a pressure relief valve plunger slideably mounted in the end of said body, a check valve plate slideably mounted over said plunger, said plate having a first valve seat engageable with said cartridge supporting means and a second valve seat engageable with said plunger, first spring means for urging said plate into engagement with said first seat such that said plate, first spring means and first seat together form a one-way flow check valve, and second spring means for urging said plunger into engagement with said second seat such that said plunger, second spring means, and plate together form a pressure relief valve for relieving excessive pressure internally of said tubular body.

* * * * *